(12) United States Patent
Fujii et al.

(10) Patent No.: US 9,902,330 B2
(45) Date of Patent: Feb. 27, 2018

(54) TONNEAU COVER ASSEMBLY FOR VEHICLE

(71) Applicant: TOYOTA BOSHOKU KABUSHIKI KAISHA, Aichi-ken (JP)

(72) Inventors: Eiji Fujii, Aichi-ken (JP); Seiei Hibino, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 69 days.

(21) Appl. No.: 15/153,871

(22) Filed: May 13, 2016

(65) Prior Publication Data

US 2016/0347255 A1 Dec. 1, 2016

(30) Foreign Application Priority Data

May 26, 2015 (JP) .................................. 2015-106882

(51) Int. Cl.
*B60R 5/04* (2006.01)

(52) U.S. Cl.
CPC .................................. *B60R 5/047* (2013.01)

(58) Field of Classification Search
CPC ........................................................ B60R 5/047
USPC ........................................... 296/37.16, 24.43
See application file for complete search history.

(56) References Cited

U.S. PATENT DOCUMENTS

| | | | |
|---|---|---|---|
| 6,843,518 B2* | 1/2005 | Schlecht | B60N 2/3011 280/749 |
| 7,080,867 B2* | 7/2006 | Woerner | B60R 5/047 296/24.43 |
| 2016/0023610 A1* | 1/2016 | Valencia Cruz | B60R 5/045 296/37.16 |

FOREIGN PATENT DOCUMENTS

JP  8-183393  7/1996

* cited by examiner

*Primary Examiner* — Joseph D. Pape
(74) *Attorney, Agent, or Firm* — Greenblum & Bernstein, P.L.C.

(57) ABSTRACT

A tonneau cover assembly for a vehicle includes a tonneau cover having flexibility, a tonneau cover winding rod, a screen having flexibility, a screen winding rod, and a case. The tonneau cover winding rod is for rolling up the tonneau cover from the first end that is fixed to the tonneau cover winding rod. The screen winding rod is for rolling up the screen from the first end that is fixed to the screen winding rod. The case holds the tonneau cover, the tonneau cover winding rod, the screen, and the screen winding rod therein. The case includes an opening for releasing and retracting the tonneau cover and the screen. The tonneau cover winding rod is configured to release the tonneau cover at a portion of the tonneau cover winding rod located higher than a portion of the screen winding rod at which the screen winding rod releases the screen.

16 Claims, 8 Drawing Sheets

TONNEAU COVER ASSEMBLY FOR VEHICLE

CROSS REFERENCE TO RELATED APPLICATION

This application claims priority from Japanese Patent Application No. 2015-106882 filed on May 26, 2015. The entire contents of the priority application are incorporated herein by reference.

TECHNICAL FIELD

The present disclosure relates to a tonneau cover assembly for a vehicle.

BACKGROUND

A tonneau cover assembly for a vehicle may include a cover winding mechanism configured to roll up two tonneau covers that can be pulled out in opposite directions with an angle difference of 180 degrees.

There is an increased demand for flexibility in layout of a cargo area of a vehicle so that users can change the layout according to their intended use. Because each of the tonneau covers described above can be pulled in one direction, the layout of the cargo area cannot be changed in various ways with such tonneau covers.

SUMMARY

The present invention was made in view of the foregoing circumstances. An object is to provide a tonneau cover assembly for a vehicle with which a layout of a cargo area of the vehicle can be arranged in various ways.

A tonneau cover assembly for a vehicle includes a tonneau cover, a tonneau cover winding rod, a screen, a screen winding rod, and a case. The tonneau cover has flexibility. The tonneau cover includes a first end a second end that is a free end. The tonneau cover winding rod is for rolling up the tonneau cover from the first end that is fixed to the tonneau cover winding rod. The screen has flexibility. The screen includes a first end and a second end that is a free end. The screen winding rod is for rolling up the screen from the first end that is fixed to the screen winding rod. The case holds the tonneau cover, the tonneau cover winding rod, the screen, and the screen winding rod therein. The case includes an opening for releasing and retracting the tonneau cover and the screen. The tonneau cover winding rod is configured to release the tonneau cover at a portion of the tonneau cover winding rod located higher than a portion of the screen winding rod at which the screen winding rod releases the screen.

According to the tonneau cover assemble for a vehicle, the layout of the cargo area of the vehicle can be arranged in various ways.

DETAILED DESCRIPTION

First Embodiment

A first embodiment will be described with reference to FIGS. 1 to 6. Arrows FR and RR in FIGS. 5 and 6 indicate a direction toward a front of a vehicle 10 and a direction toward a rear of the vehicle 10, respectively. Arrows UP and DW indicate a direction toward a top of the vehicle 10 and a direction toward a bottom of the vehicle 10, respectively.

Figure 1:
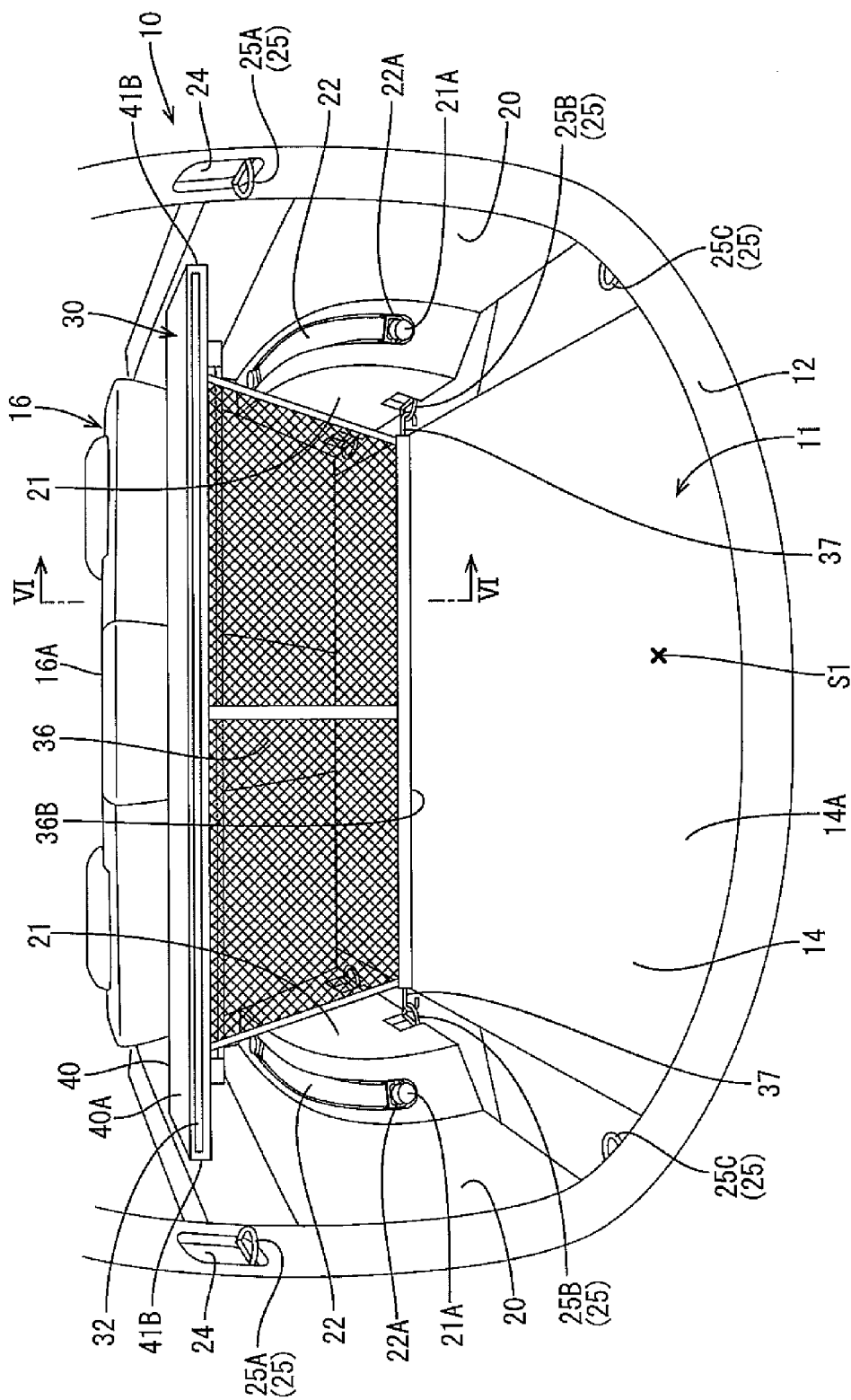
FIG. 1 is a perspective view of a cargo area of a vehicle with a tonneau cover assembly according to a first embodiment viewed from an upper rear of the vehicle.

As illustrated in FIG. 1, the vehicle 10 includes a cargo area 11 at the back. The cargo area 11 is accessible through a rear opening 12 of the vehicle 10. The cargo area 11 includes a floorboard 14, and cargo side-trims 20. The floorboard 14 includes a top surface 14A on which articles are placed. The cargo side trims 20 are disposed at sides of the floorboard 14, respectively, that is, separated from each other in the width direction of the vehicle 10 and configured as sidewalls of the cargo area 11. The vehicle 10 includes rear seats 16 including backrests 16A that are disposed in front of the floorboard 14 and configured as a front wall of the cargo area 11. The backrests 16A define storage space S1 of the cargo area 11 with the floorboard 14 and the cargo side-trims 20.

As illustrated in FIG. 1, the vehicle 10 includes a tonneau cover assembly (a tonneau cover assembly for a vehicle) 30 in the cargo area 11. The cargo area 11 includes underfloor storage space S2 (see FIG. 5) under the floorboard 14. The underfloor storage space S2 includes a tonneau cover assembly storage space 18 for storing the tonneau cover assembly 30.

Figure 2:
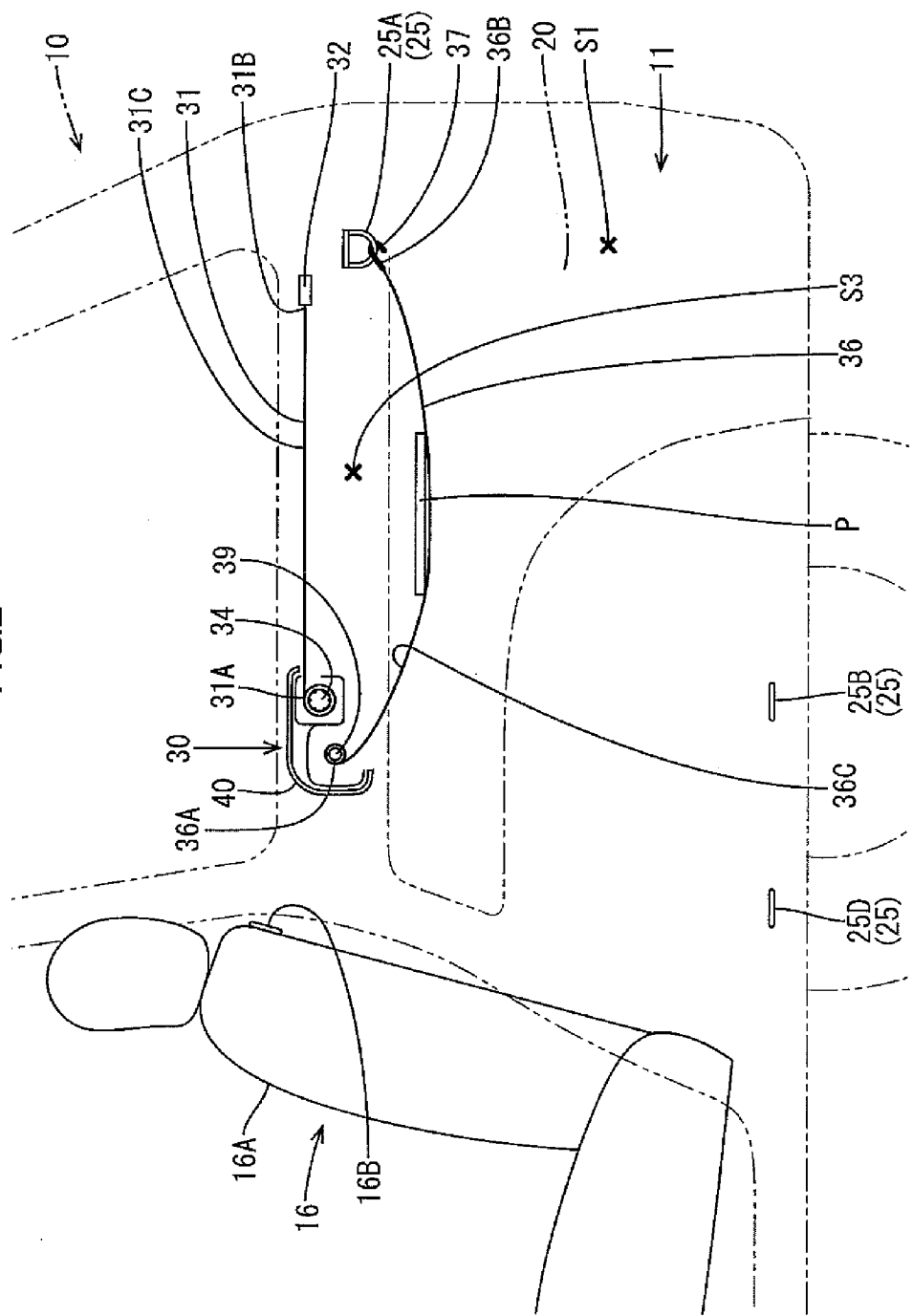
FIG. 2 is an explanatory view of the tonneau cover assembly with a screen in a horizontal position.
Figure 3:
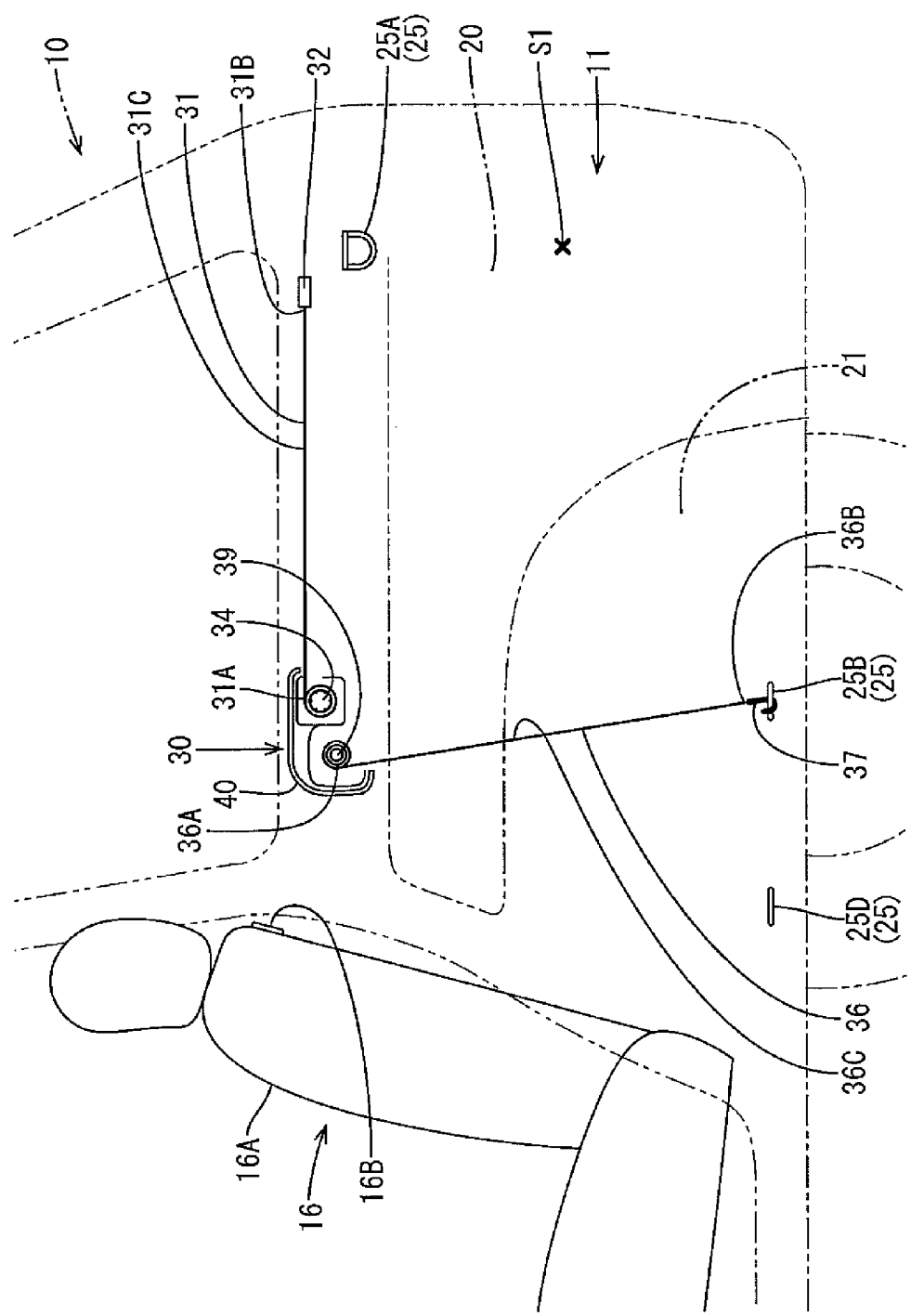
FIG. 3 is an explanatory view of the tonneau cover assembly with the screen in a vertical position.

As illustrated in FIGS. 2 and 3, the tonneau cover assembly 30 includes a tonneau cover 31, a tonneau cover winding rod 34, a net (a screen) 36, a net winding rod (a screen winding rod) 39, and a case 40. The tonneau cover assembly 30 is for coving the storage space S1 of the cargo area 11 with the tonneau cover 31 and for diving the storage space S1 with the net 36. The tonneau cover assembly 30 is attached to the cargo side-trims 20 such that the tonneau cover assembly 30 can be removed from the cargo side-trims 20. The tonneau cover assembly 30 removed from the cargo side-trims 20 can be stored in the underfloor storage space S2 (or the tonneau cover assembly storage space 18). When the tonneau cover assembly 30 is stored in the tonneau cover assembly storage space 18, large space is provided in the storage space S1 with nothing to divide the storage space S1.

Next, configurations of the cargo side-trims 20 and the tonneau cover assembly 30 will be described.

As illustrated in FIG. 1, each of the cargo side-trims 20 has a planar shape that extends in the top-bottom direction and the front-rear direction of the vehicle 10. A surface on the interior side of the vehicle 10 faces the storage space S1 of the cargo area 11. The cargo side-trims 20 are disposed at the right side and the left side of the cargo area 11. The right cargo side-trim 20 and the left cargo side-trim 20 are symmetric to each other and thus only the right cargo side-trim 20 will be described in the following description and the left cargo side-trim 20 will not be described in detail.

Figure 5:
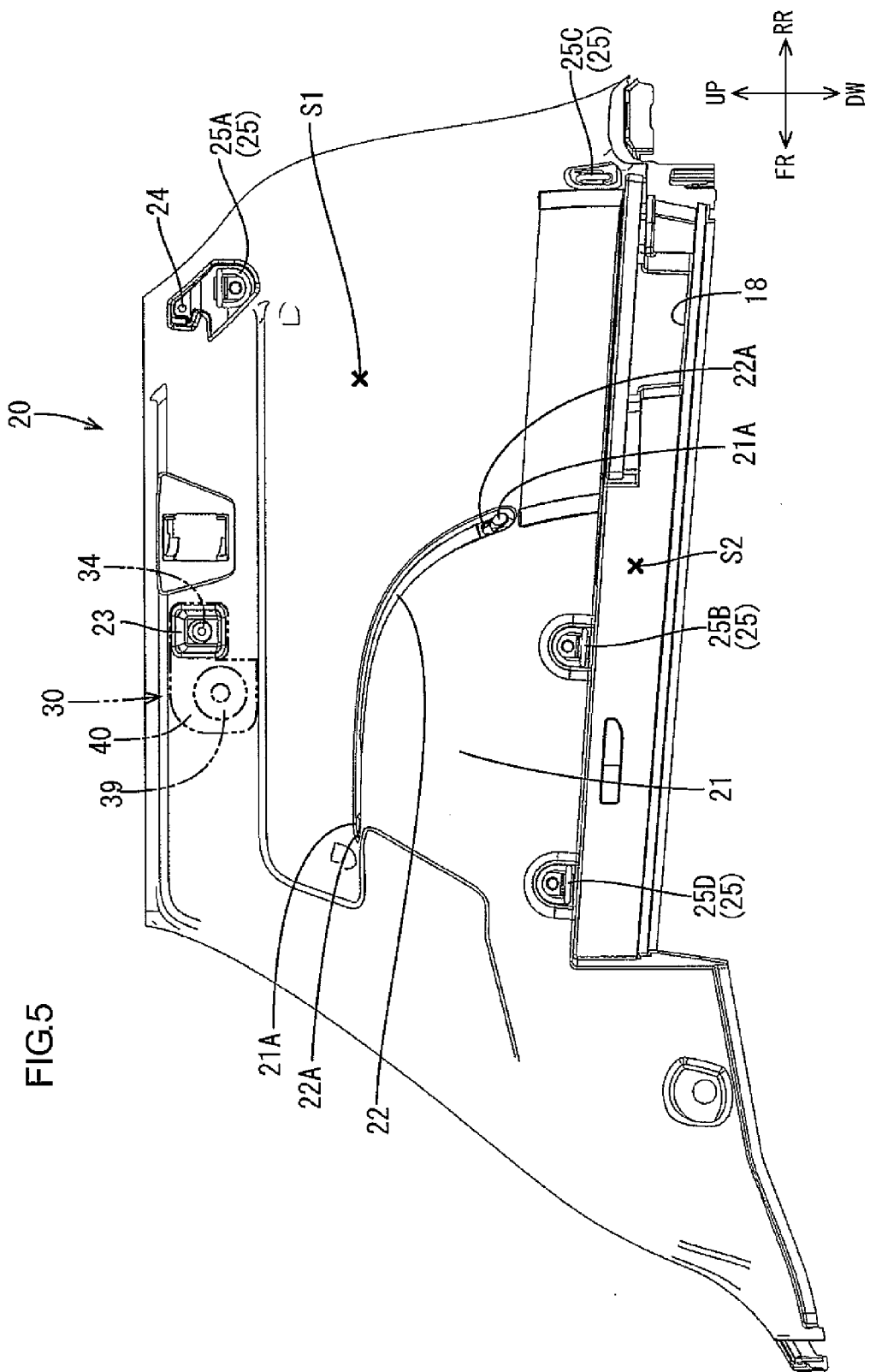
FIG. 5 is a side view illustrating a cargo side-trim.

As illustrated in FIG. 5, the cargo side-trim 20 includes a wheel housing portion 21 at a lower front thereof. The wheel housing portion 21 project toward the interior of the cargo area 11 and has a shape along a wheel housing. A cargo strap 22 is provided for holding a cargo in place. The cargo strap 22 is placed along the top surface to the rear surface of the wheel housing portion 21 and attached to the cargo side-trim 20. The cargo strap 22 includes cargo strap fastening pieces 22A configured to be fastened to the cargo strap holder 21A or one of net holders 25, which will be described later. A user can fasten the cargo strap fastening pieces 22A to the desired holder 21A or 25 to hold the cargo in place.

As illustrated in FIG. 5, the cargo side-trim 20 includes a case mounting portion 23 to which the case 40 of the tonneau cover assembly 30 is fixed above the wheel housing portion 21. The case mounting portion 23 is located at a position slightly more to the front of the vehicle 10 than the middle of the cargo area 11 in the front-rear direction of the vehicle 10. More specifically, the case mounting portion 23 is located at a position at which a dimension of the cargo area 11 in the front-rear direction of the vehicle 10 is divided with a front to rear ratio in a range of 3:7 to 4:6. The cargo side-trim 20 includes a tonneau cover holder 24 configured to receive a handle 32 of the tonneau cover 31. The case mounting portion 23 and the tonneau cover holder 24 are recesses formed in the surface of the cargo side-trim 20 facing the interior of the cargo area 11.

As illustrated in FIG. 5, the cargo side-trim 20 includes the net holder 25 that receive a hook 37 of the net 36. The net holders 25 include a first net holder 25A, a second net holder 25B, a third net holder 25C, and a fourth net holder 25D. The first net holder 25A is located adjacent to and below the tonneau cover holder 24. The second net holder 25B is located at the lower end of the storage space S1 (adjacent to the top surface 14A of the floorboard 14). The third net holder 25C is located more to the rear of the vehicle 10 than the second net holder 25B, more specifically, at the rear of the storage space S1 (close to the edge of the rear opening 12). The fourth net holder 25D is located more to the front of the vehicle 10 than the second net holder 25B, more specifically, at the front end of the storage space S1. In the following description, the net holders 25 are referred to as the first to the fourth net holders 25A to 25D to describe them individually and referred to as the net holders 25 to describe them without discriminating from one another.

As illustrated in FIG. 5, each of the net holder 25 includes a fixed portion fixed to the cargo side-trim 20 and a hooking portion in a D-ring shape and attached to the fixed portion. The hooking portion is rotatable with a linear portion as a rotary axis.

Figure 4:
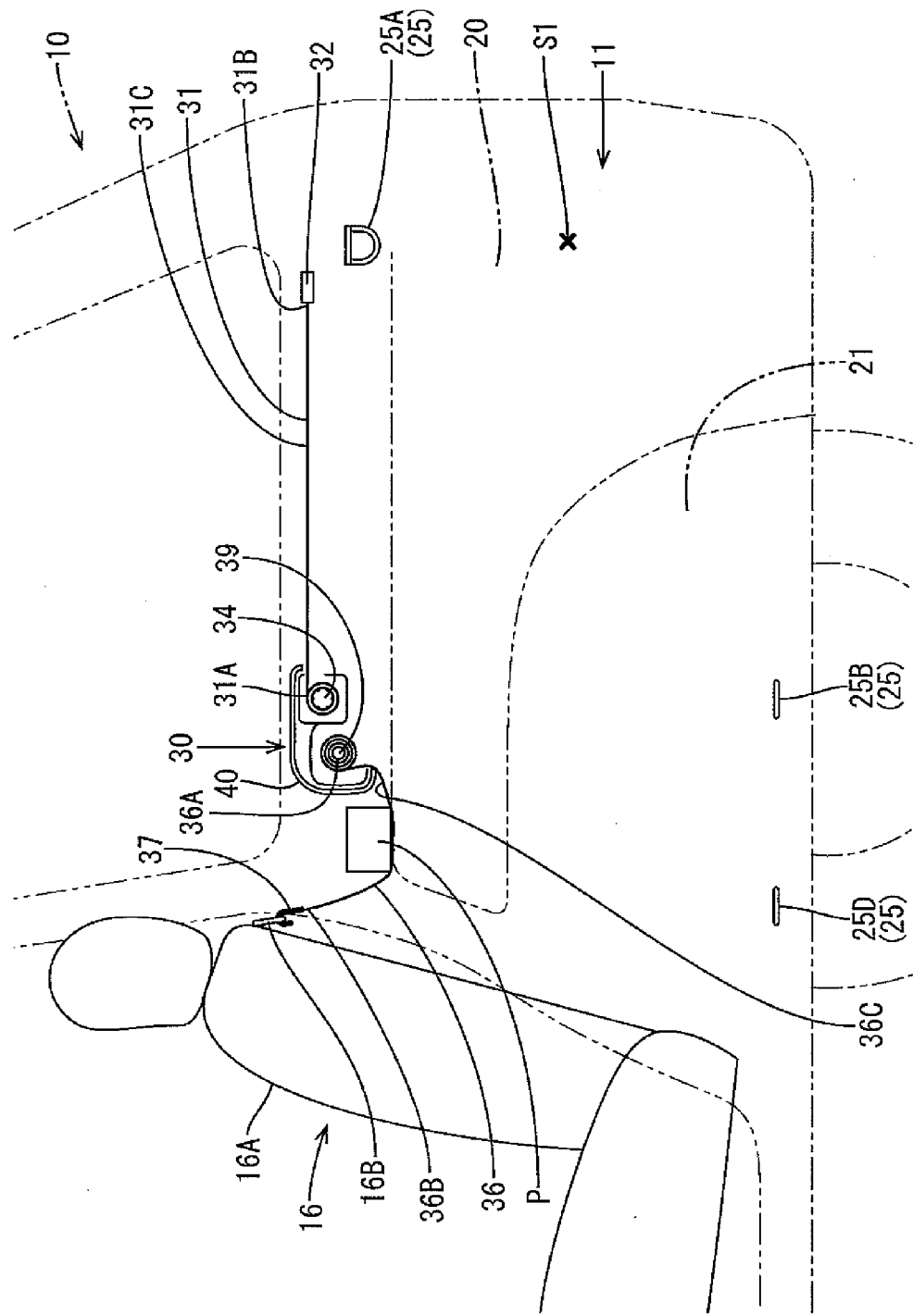
FIG. 4 is an explanatory view of the tonneau cover assembly with the screen in a front horizontal position.

As illustrated in FIGS. 2 to 4, the tonneau cover 31 includes a screen having flexibility. The tonneau cover 31 is a rectangular member having light blocking properties, for example, an artificial leather sheet made of synthetic resin. The tonneau cover 31 includes a sheet surface 31C. The tonneau cover 31 may be placed such that the sheet surface 31C extends in the front-rear direction of the vehicle 10 to cover the cargo area 11 and hide the cargo stored in the cargo area 11. The tonneau cover 31 includes a first end 31A fixed to the tonneau cover winding rod 34. The tonneau cover 31 includes a second end 31B that is a free end and to which the handle 32 is fixed. The handle 32 has a long plate shape. The user can hold the handle 32 for deploying or retracting the tonneau cover 31. When the tonneau cover 31 is deployed, the handle 32 is held with the tonneau cover holder 24. In this condition, the handle 32 functions as a frame for holding the tonneau cover 31 deployed. When the tonneau cover 31 is retracted in the case 40 (the tonneau cover 31 is rolled up with the tonneau cover winding rod 34), the handle 32 is held against an outer surface of the case 40 (an edge of a tonneau cover case opening 41A). The user can hold the handle 32 without inserting his or her fingers or hand into the case 40 to pull the tonneau cover 31 out of the case 40.

Figure 6:
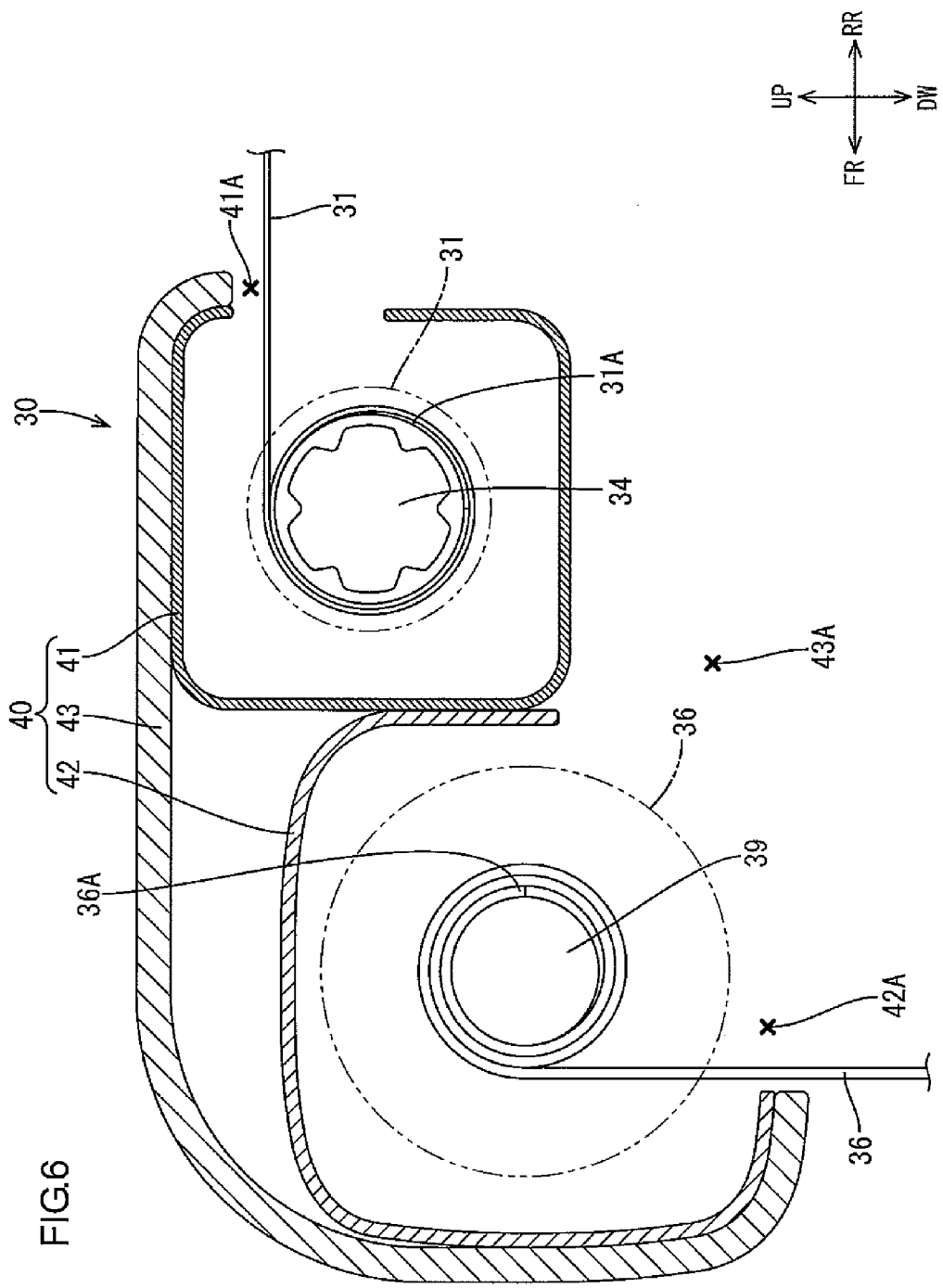
FIG. 6 is a cross-sectional view of the tonneau cover assembly along line VI-VI in FIG. 1.

As illustrated in FIG. 6, the tonneau cover winding rod 34 is configured to roll up the tonneau cover 31 from the first end 31A. The user can pull the tonneau cover 31 out of the case 40 when needed. The tonneau cover winding rod 34 is a column placed in a horizontal position so as to extend in the width direction of the vehicle 10. The tonneau cover winding rod 34 is rotatable with a rotary axis (an axis thereof) aligned with the width direction of the vehicle 10. The tonneau cover winding rod 34 includes a rotary winding mechanism that includes a spring. The rotary winding mechanism applies a force to the tonneau cover 31 in a winding direction (a counterclockwise in FIG. 6). In FIG. 6, the tonneau cover 31 around the tonneau cover winding rod 34, that is, retracted in the case 40 is indicated with a two-dot chain line.

As illustrated in FIGS. 2 to 4, the net 36 includes a screen having flexibility. The net 36 is a woven screen having flexibility higher than the tonneau cover 31. The net 36 has a rectangular shape in a plan view. A dimension of the net 36 in the front-rear direction of the vehicle 10 is larger than a dimension between the case 40 and the first net holder 25A, that is, larger than the tonneau cover 31 (see FIG. 2). A dimension of the net 36 in the width direction of the vehicle 10 is smaller than the tonneau cover 31 so that interference between the net 36 and the wheel housing portion 21 is less likely to occur (see FIG. 1). According to the configuration, the net 36 can be arranged in various positions in the cargo area 11 to arrange the layout of the cargo area 11 in various ways. Layout variations of the cargo area 11 with the net 36 will be described layer.

As illustrated in FIGS. 1 and 6, the net 36 includes a first end 36A fixed to the net winding rod 39 and a second end 36B. Hooks (screen holding pieces) 37 are fixed to side edges of the second end 36B, respectively. The hooks 37 are fixed to corners of the second end 36B of the net 36 via components having flexibility such as rubbers. The hooks 37 are configured to hook to the respective net holder 25 for holding the second end 36B of the net 36 at the positions of the net holder 25 with respect to the front-rear direction of the vehicle 10. When the net 36 is retracted in the case 40 (or rolled up with the net winding rod 39), the hooks 37 project from the case 40 and thus the user can hold the hooks 37 to pull the net 36 out of the case 40.

As illustrated in FIG. 6, the net winding rod (a screen winding rod) 39 is configured to roll up the net 36. The user can pull the net 36 out of the case 40. The net winding rod 39 is a column placed in the width direction of the vehicle 10. The net winding rod 39 is rotatable with a rotary axis (an axis thereof) aligned with the width direction of the vehicle 10. The net winding rod 39 includes a rotary winding mechanism that includes a spring. The rotary winding mechanism applies a force to the net 36 in a winding direction (a counterclockwise in FIG. 6). In FIG. 6, the net 36 rolled up with the net winding rod 39, that is, retracted in the case 40 is indicated with a two-dot chain line. When retracted in the case 40, an outer diameter of the net 36 is larger than an outer diameter of the tonneau cover 31.

As illustrated in FIG. 6, the case 40 is configure to hold the tonneau cover winding rod 34 and the net winding rod 39 therein. The case 40 has a function for integrating the tonneau cover 31 and the net 36 into a single unit and collectively handling the tonneau cover 31 and the net 36. The case 40 includes a tonneau cover case 41, a net case 42, and an outer case 43. The tonneau cover case 41 made of aluminum holds the tonneau cover winding rod 34 therein. The net case 42 made of aluminum holds the net winding rod 39 therein. The outer case 43 made of synthetic resin holds the tonneau cover case 41 and the net case 42 therein. The outer case 43 defines an outer surface (or a design) of the tonneau cover assembly 30.

As illustrated in FIG. 1, the outer case 43 of the case 40 is a rectangular pipe. The outer case 43 is configured to be installed in the cargo area 11 with the long axis thereof aligned with the width direction of the vehicle 10. The case 40 includes side portions 41B that are sidewalls of the portion of the case 40 in which the tonneau cover winding rod 34 is held. The side portions 41B are pressed against the cargo side-trims 20 with forces applied thereto in the width direction of the vehicle 10. The case 40 can be extended or shortened and thus the side portions 41B can be fitted in the case mounting portions 23 in the respective side-trims 20. According to the configuration, the case 40 can be easily mounted or removed from the cargo side-trims 20. The top surface 40A of the case 40 is configured to be flush with the sheet surface 31C of the tonneau cover 31 when the tonneau cover 31 is deployed and to cover the cargo area 11 together with the tonneau cover 31.

As illustrated in FIG. 6, the case 40 includes a tonneau cover case opening 41A, a net case opening 42A (an opening for releasing the screen out of the case), and an outer case opening 43A. The tonneau cover case opening 41A opens toward the rear of the vehicle 10 and the net case opening 42A opens toward the bottom and the rear of the vehicle 10 when the case 40 is installed in the cargo area 11. The tonneau cover case opening 41A is for releasing and retracting the tonneau cover 31. The net case opening 42A is for releasing and retracting the net 36. The outer case opening 43A is formed in the outer case 43. The tonneau cover case opening 41A and the net case opening 42A are arranged in the outer case opening 43A so as to extend parallel to each other. The outer case opening 43A is formed as if a rear wall located closer to the rear of the vehicle 10 and a lower wall closer to the bottom of the vehicle are cut. The tonneau cover case opening 41A is formed as if a rear wall located closer to the rear of the vehicle 10 is cut. The net case opening 42A is formed as if a rear wall located closer to the rear of the vehicle 10 and a lower wall located closer to the bottom of the vehicle 10 are cut.

Next, a relationship between the tonneau cover 31 and the net 36 and a relationship between the tonneau cover winding rod 34 and the net winding rod 39 will be described with reference to FIG. 6.

In the case 40, the net winding rod 39 is located more to the front of the vehicle 10 than the tonneau cover winding rod 34. An upper end of the net winding rod 39 is positioned lower than an upper end of the tonneau cover winding rod 34 and higher than a lower end of the tonneau cover winding rod 34. The tonneau cover winding rod 34 is configured to release the tonneau cover 31 at a portion thereof located higher than a portion of the screen winding rod at which the screen winding rod releases the screen. The tonneau cover winding rod 34 is configured to release the tonneau cover 31 at an upper portion thereof when the tonneau cover 31 is pulled toward the rear of the vehicle 10. The net winding rod 39 is configured to release the net 36 at a lower portion thereof when the net 36 is pulled toward the rear of the vehicle 10. A winding direction in which the net winding rod 39 rotates to roll up the net 36 is opposite to a winding direction in which the tonneau cover winding rod 34 rotates to roll up the tonneau cover 31. A position at which the tonneau cover 31 comes out of the case 40 is higher than a position at which the net 36 comes out of the case 40.

Next, the layout variations of the cargo area 11 with the net 36 will be described with reference to FIGS. 2 to 4.

Arrangements of the net 36 include a horizontal arrangement, a vertical arrangement, and a front horizontal arrangement. In the horizontal arrangement, the net 36 is placed in the horizontal position (see FIG. 2), that is, the net 36 horizontally spreads. In the vertical arrangement, the net 36 is placed in the vertical position (see FIG. 3), that is, the net 36 vertically spreads. The direction in which the net 36 spreads in the horizontal arrangement crosses the direction in which the net 36 spreads in the vertical arrangement. In the front horizontal arrangement, the second end 36B of the net 36 is hooked to the backrest 16A and the net 36 extends from the case 40 toward the front of the vehicle 10 such that a portion of the net 36 spreads horizontally (see FIG. 4).

In the horizontal arrangement illustrated in FIG. 2, the net 36 is pulled toward the rear of the vehicle 10 and the hooks 37 are hooked to the respective first net holder 25A. When an article P is placed on the net 36, a force is applied to the net 36 in a direction opposite to a direction in which the net 36 is rolled up by the net winding rod 39 due to the weight of the article P and thus the net 36 becomes loose. With the net 36 in the horizontal arrangement, an upper portion of the storage space S1 of the cargo area 11 which tends to be dead space is provided as additional storage space S3. The tonneau cover 31 can be pulled toward the rear of the vehicle 10 without interfered by the net 36 to arrange the net 36 in the horizontal position. When the tonneau cover 31 is deployed while the net 36 is in the horizontal position, the additional storage space S3 is covered with the tonneau cover 31, that is, the article P in the additional storage space S3 is hidden from view from outside. According to the configuration, the additional storage space S3 has a proper level of security.

To arrange the net 36 in the vertical position illustrated in FIG. 3, the net 36 is pulled toward the bottom of the vehicle 10 and the hooks 37 are hooked to the respective second net holder 25B. With the net 36 in the vertical arrangement, the storage space S1 of the cargo area 11 is divided into front storage area and rear storage area. The arrangements of the net 36 further include an oblique arrangement. In the oblique arrangement, the hooks 37 are hooked to the respective third net holder 25C. A cargo placed on the top surface 14A of the floorboard 14 can be covered with the net 36 in the oblique arrangement to restrict the cargo from shifting toward the rear opening 12. The arrangements of the net 36 include another vertical arrangement. In the other vertical arrangement, the hooks 37 are hooked to the respective fourth net holder 25D. With the net 36 in the other vertical arrangement, the passenger compartment is separated from the cargo area 11. The tonneau cover 31 can be pulled out without interfered by the net 36 in any of the vertical arrangements or the oblique arrangement.

In the front horizontal arrangement illustrated in FIG. 4, the net 36 is pulled down and then toward the front of the vehicle 10 and the hooks 37 are hooked to the net holder 16B on the rear surface of the backrest 16A. The net 36 in the front horizontal arrangement extends across space between the case 40 and the rear surface of the backrest 16A. The article P can be placed on the net 36 in the front horizontal arrangement. A passenger can easily access the article P placed on the net 36 in the front horizontal arrangement from the passenger compartment. Furthermore, the tonneau cover 31 can be pulled toward the rear of the vehicle 10 without interfered by the net 36 in the front horizontal arrangement.

Next, functions and effects of the tonneau cover assembly 30 will be described.

According to the tonneau cover assembly 30, the tonneau cover 31 is released from the case 40 at the position higher than the net 36. Therefore, the tonneau cover 31 is less likely to be interfered by the net 36 that can be placed in various arrangements when covering the cargo area 11 with the tonneau cover 31. With the net 36 that is pulled toward the rear of the vehicle 10 and placed in the horizontal position, the layout of the cargo area 11 is arranged such that an article placed on the net 36 can be covered with the tonneau cover 31. Namely, the layout of the cargo area 11 is arranged in various ways according to intended use.

The tonneau cover winding rod 34 is located closer to the top of the vehicle 10 than the net winding rod 39. According to the configuration, the tonneau cover 31 is released from the case 40 at the position higher than the net 36. The net winding rod 39 is positioned so as to overlap the tonneau cover winding rod 34 when viewed from the front of the vehicle 10. In comparison to a configuration in which the net winding rod 39 is positioned so as not to overlap the tonneau cover winding rod 34 when viewed from the front of the vehicle 10 and the lower end of the tonneau cover winding rod 34 is located higher than the upper end of the net winding rod 39, a dimension of the tonneau cover assembly 30 measuring in the vertical direction is reduced. Therefore, the tonneau cover assembly 30 is easily stored in the underfloor storage space S2 (or the tonneau cover assembly storage space 18), a depth of which measuring in the top-bottom direction of the vehicle 10 is limited.

The tonneau cover winding rod 34 is configured to release the tonneau cover 31 at the upper portion thereof when the tonneau cover 31 is pulled toward the rear of the vehicle 10. The net winding rod 39 is configured to release the net 36 at the lower portion of the net winding rod 39. The tonneau cover winding rod 34 releases the tonneau cover 31 at the position thereof located higher than the position of the net winding rod 39 at which the net winding rod 39 releases the net 36. According to the configuration of the tonneau cover assembly 30 in which the tonneau cover 31 is pulled toward the rear of the vehicle 10, the tonneau cover 31 is properly released from the case 40 at the position higher than the position at which the net 36 is released from the case 40.

The net case opening 42A opens toward the bottom and the rear of the vehicle 10. Therefore, the net 36 can be pulled in various directions between the vertical direction toward the bottom of the vehicle 10 and the horizontal direction toward the rear of the vehicle 10 to arrange the layout of the cargo area 11. In a configuration in which a net case opening opens only toward a rear of a vehicle, the net case may be an obstacle to pullout of a net toward the bottom of the vehicle. According to the configuration of this embodiment, the case 40 does not interfere with the pullout of the net 36 toward the bottom or the rear of the vehicle 10. Therefore, the net 36 can be easily placed in any of the horizontal arrangements, the vertical arrangements, and the oblique arrangement.

The net 36 can be placed in the horizontal arrangements, the vertical arrangements, and the oblique arrangement. In the horizontal arrangements, the net 36 horizontally spreads. In the vertical arrangements, the net 36 vertically spreads. In the oblique arrangement, the net 36 obliquely spreads. When the net 36 is placed in the horizontal arrangements, the net 36 can be used as a net rack, for example, the article P can be placed on the net 36. When the net 36 is placed in any of the vertical arrangements and the oblique arrangement, the net 36 can be used as a partition to divide the cargo area 11. With the net 36, the layout of the cargo area 11 can be arranged in various ways.

The net 36 is more flexible than the tonneau cover 31. When the article P is placed on the net 36 that is pulled toward the rear of the vehicle 10 and arranged in the horizontal position, the net 36 becomes loose. When the tonneau cover 31 is deployed to cover up the article P, the storage space S3 is provided between the net 36 and the tonneau cover 31 because the net 36 is loose. Furthermore, because the net 36 is flexible, the net 36 can be placed in various positions and thus the layout of the cargo area 11 is arranged in various ways.

Second Embodiment

Figure 7:
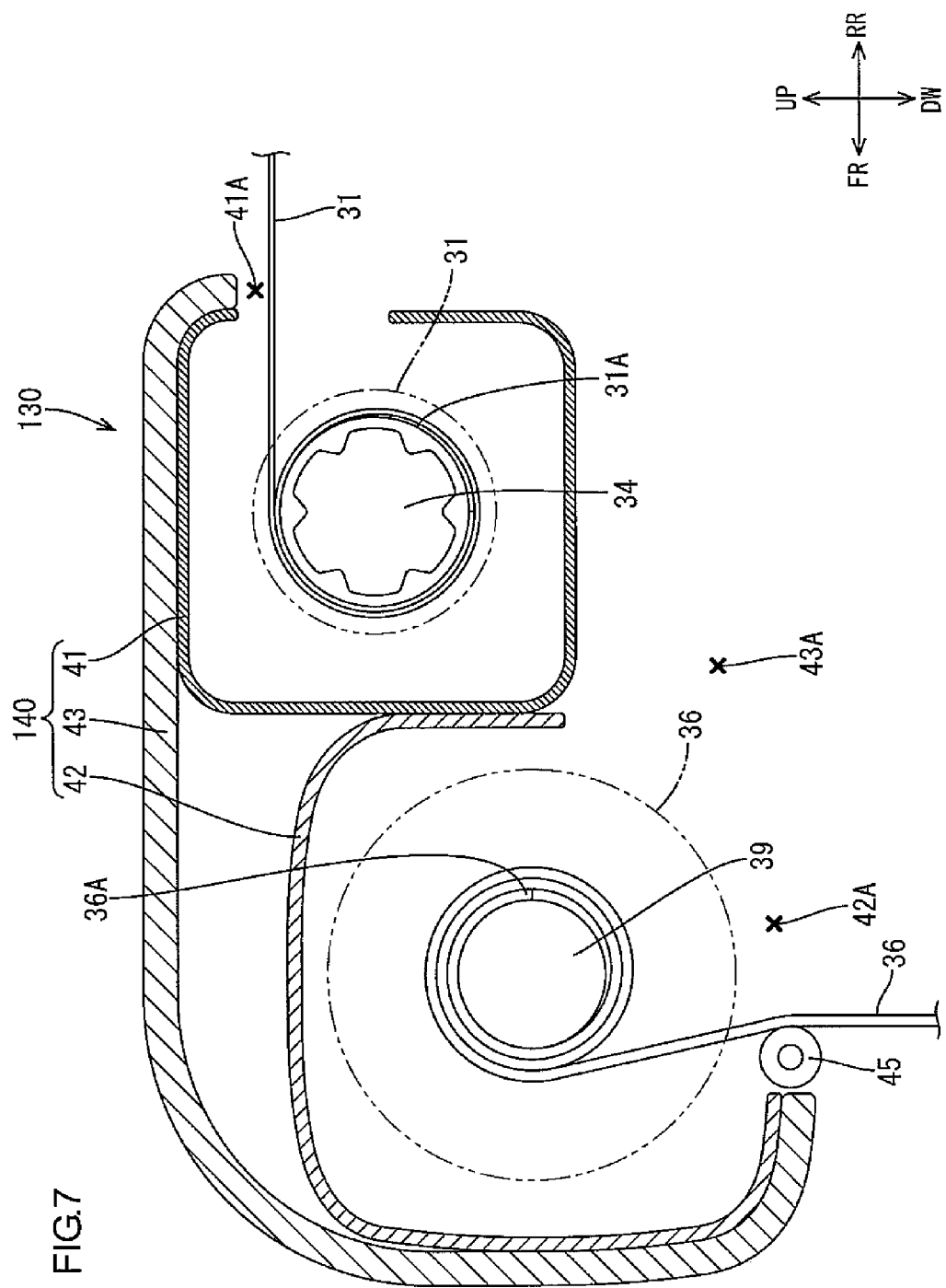
FIG. 7 is a cross-sectional view of a tonneau cover assembly according to a second embodiment.

A second embodiment will be described with reference to FIG. 7. A tonneau cover assembly 130 includes a case 140 that includes rollers 45. Configurations, functions, and effects similar to those of the first embodiment will not be described.

The case 140 includes the rollers 45 at a lower edge of the net case opening 42A. The rollers 45 are configured to rotate in a direction in which the net 36 is pulled out and in a direction in which the net 36 is rolled up. The rollers 45 are disposed at intervals in the width direction of the vehicle 10. Rollers 45 are configured to rotate on the net 36 as the net 36 is pulled or rolled up to reduce friction between the net 36 and the case 140.

Pullout of the net 36 toward the bottom or the front of the vehicle 10 may be interfered by the case 140. According to the configuration of this embodiment, the interference is less likely to occur and thus the net 36 can be easily pulled out. The net 36 can be easily placed in various positions and the layout of the cargo area 11 is easily arranged in various ways.

Third Embodiment

Figure 8:
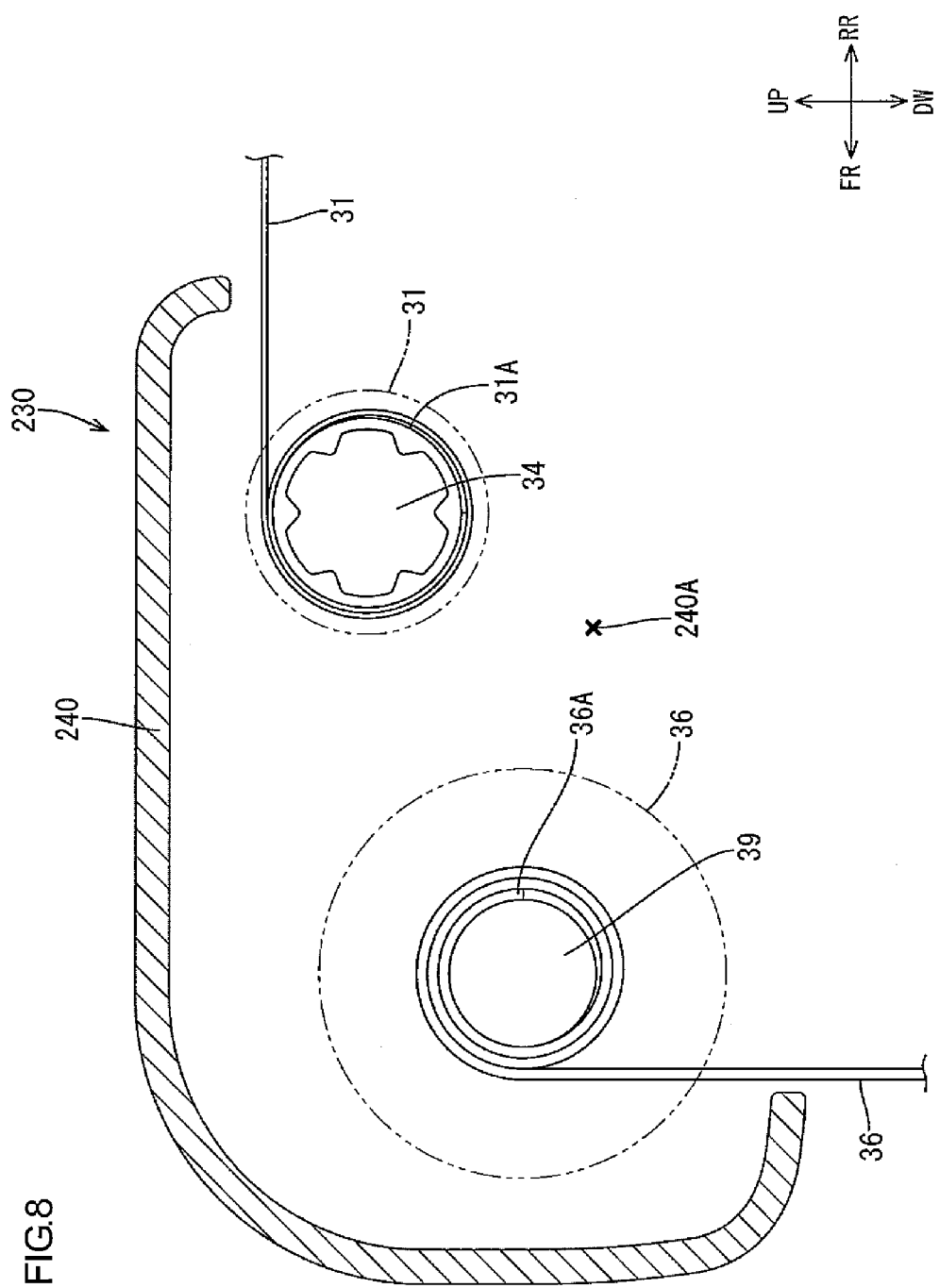
FIG. 8 is a cross-sectional view of a tonneau cover assembly according to a third embodiment.

A third embodiment will be described with reference to FIG. 8. A tonneau cover assembly 230 includes a case 240. Configurations, functions, and effects similar to those of the first embodiment will not be described.

The case 240 is a single case that does not include other cases for holding the tonneau cover winding rod 34 and the net winding rod 39, respectively, such as the tonneau cover case 41 and the net case 42 in the first embodiment. The case 240 holds the tonneau cover winding rod 34 and the net winding rod 39 therein. The case 240 includes an opening 240A that extends from an upper rear to a lower front of the case 240. Namely, the opening 240A is formed as if a portion of the case 240 between the upper rear and the lower front is cut. The opening 240A includes an upper portion through which the tonneau cover 31 is pulled out and a lower portion through which the net 36 is pulled out.

Other Embodiments

The technology described herein is not limited to the above embodiments described above and the drawings. The following embodiments may be included in the technical scope of the present invention.

(1) Screens other than the net may be used.
(2) Any of the screens may be used as a tonneau cover.

(3) The positions or the winding directions of the tonneau cover winding rod 34 and the net winding rod 39 can be altered as long as the tonneau cover winding rod 34 is positioned above the net winding rod 39. The net winding rod 39 may be positioned so as to overlap the tonneau cover winding rod 34 when viewed from the rear of the vehicle 10.

(4) The deployment of the tonneau cover or the screen can be altered. For example, the screen may be pulled downward and then upward to hook the screen to a ceiling of a vehicle.

(5) The screen holding pieces are not limited to the hooks. The tonneau cover assembly may include net holder exclusive for holding the screen holding pieces.

(6) The position of the tonneau cover assemblies 30, 130 and 230 is not limited to the position of the above embodiments. For example, the tonneau cover assemblies 30, 130 and 230 may be may be installed at the front end of the cargo area 11.

(7) The shapes and the arrangements of the tonneau cover 31, the tonneau cover winding rod 34, the net 36, the net winding rod 39, and the cases 40, 140 and 240 may be altered as appropriate.

What is claimed is:

1. A tonneau cover assembly for a vehicle comprising:
    a tonneau cover having flexibility and including a first end and a second end that is a free end;
    a tonneau cover winding rod for rolling up the tonneau cover from the first end that is fixed to the tonneau cover winding rod;
    a screen having flexibility including a first end and a second end that is a free end;
    a screen winding rod for rolling up the screen from the first end that is fixed to the screen winding rod; and
    a case holding the tonneau cover, the tonneau cover winding rod, the screen, and the screen winding rod therein, the case including an opening for releasing and retracting the tonneau cover and the screen, wherein
    the tonneau cover winding rod is configured to release the tonneau cover at a portion thereof located higher than a portion of the screen winding rod at which the screen winding rod releases the screen, and
    the case includes an opening that opens toward a bottom and a rear of the vehicle for releasing the screen out of the case.

2. The tonneau cover assembly according to claim 1, wherein
    the screen winding rod is disposed with an upper end thereof located lower than an upper end of the tonneau cover winding rod.

3. The tonneau cover assembly according to claim 1, wherein
    the tonneau cover winding rod is configured to release the tonneau cover at an upper portion thereof, and
    the screen winding rod is configured to release the screen at a lower portion thereof.

4. The tonneau cover assembly according to claim 1, further comprising:
    upper screen holders located at a height position relative to a height position of the screen winding rod for holding the screen in a horizontal position; and
    lower screen holders located lower than the screen winding rod for holding the screen in a vertical position.

5. The tonneau cover assembly according to claim 1, wherein
    the screen is a net having flexibility higher than the flexibility of the tonneau cover.

6. The tonneau cover assembly according to claim 4, further comprising:
    rear screen holders located more to a rear of the vehicle than the upper screen holders and the lower screen holders for holding the screen in an oblique position.

7. The tonneau cover assembly according to claim 6, wherein
    the screen holding pieces are hooked on the upper screen holders to hold the screen in the horizontal position,
    the screen holding pieces are hooked on the lower screen holders to hold the screen in the vertical position, and
    the screen holding pieces are hooked on the rear screen holders to hold the screen in the oblique position.

8. The tonneau cover assembly according to claim 1, wherein
    the case includes a tonneau cover case, a screen case, and an outer case,
    the tonneau cover case holds the tonneau cover and the tonneau cover winding rod therein and includes an opening that opens toward a rear of the vehicle,
    the screen case holds the screen and the screen winding rod therein and includes an opening that opens toward a bottom and a rear of the vehicle,
    the outer case holds the tonneau cover case and the screen case therein and includes an opening that opens toward the bottom and the rear of the vehicle, and
    the tonneau cover case and the screen case are arranged in the outer case with an upper edge of the opening of the tonneau cover case is aligned with an upper edge of the opening of the outer case and a lower edge of the opening of the screen case is aligned with a lower edge of the opening of the outer case.

9. The tonneau cover assembly according to claim 4, further comprising:
    front screen holders on a rear surface of a backrest of a rear seat in the vehicle for holding the screen between the case and the rear surface of the backrest of the rear seat.

10. The tonneau cover assembly according to claim 8, wherein
    the case further comprises:
    rollers disposed at intervals in a width direction of the vehicle at the lower edge of the opening of the screen case configured to rotate on the screen in a direction in which the screen is pulled out and in a direction in which the screen is rolled up.

11. A tonneau cover assembly for a vehicle comprising:
    a tonneau cover having flexibility and including a first end and a second end that is a free end;
    a tonneau cover winding rod for rolling up the tonneau cover from the first end that is fixed to the tonneau cover winding rod;
    a screen having flexibility including a first end and a second end that is a free end;
    a screen winding rod for rolling up the screen from the first end that is fixed to the screen winding rod; and
    a case holding the tonneau cover, the tonneau cover winding rod, the screen, and the screen winding rod therein, the case including an opening for releasing and retracting the tonneau cover and the screen, wherein
    the tonneau cover winding rod is configured to release the tonneau cover at a portion thereof located higher than a portion of the screen winding rod at which the screen winding rod releases the screen,
    the screen winding rod is disposed with an upper end thereof located lower than an upper end of the tonneau cover winding rod, and
    the screen winding rod is disposed more to a front of the vehicle than the tonneau cover winding rod with the upper end of the screen winding rod at a position in the vehicle higher than a lower end of the tonneau cover winding rod.

12. A tonneau cover assembly for a vehicle comprising:
a tonneau cover having flexibility;
a tonneau cover winding rod for rolling up the tonneau cover;
a screen having flexibility;
a screen winding rod for rolling up the screen; and
a case holding the tonneau cover winding rod and the screen winding rod therein, the case including an opening including an upper portion through which the tonneau cover is pulled out and a lower portion through which the screen is pulled out, wherein
the case includes an opening that opens toward the bottom and the rear of the vehicle and through which the screen is pulled out of the case.

13. The tonneau cover assembly according to claim 12, wherein
the tonneau cover winding rod is disposed at a position in the vehicle higher than a position of the screen winding rod.

14. The tonneau cover assembly according to claim 12, wherein
the tonneau cover winding rod is configured to roll up the tonneau cover such that the tonneau cover is released from the tonneau cover winding rod at an upper portion of the tonneau cover winding rod when the tonneau cover is pulled toward a rear of the vehicle, and
the screen winding rod is configured to roll up the screen such that the screen is released from the screen winding rod at a lower portion of the screen winding rod when the screen is pulled toward the rear of the vehicle.

15. The tonneau cover assembly according to claim 12, further comprising:
screen holders for holding the screen in a horizontal position and screen holders for holding the screen in a vertical position.

16. The tonneau cover assembly according to claim 12, wherein the screen is a net having flexibility higher than the flexibility of the tonneau cover.

* * * * *